United States Patent
Aliakseyeu et al.

(10) Patent No.: US 12,075,542 B2
(45) Date of Patent: Aug. 27, 2024

(54) CONTROLLER FOR TRAINING A MACHINE FOR AUTOMATIZING LIGHTING CONTROL ACTIONS AND A METHOD THEREOF

(71) Applicant: SIGNIFY HOLDING B.V., Eindhoven (NL)

(72) Inventors: Dzmitry Viktorovich Aliakseyeu, Eindhoven (NL); Bartel Marinus Van De Sluis, Eindhoven (NL); Tobias Borra, Rijswijk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 136 days.

(21) Appl. No.: 17/779,593

(22) PCT Filed: Nov. 23, 2020

(86) PCT No.: PCT/EP2020/083028
§ 371 (c)(1),
(2) Date: May 25, 2022

(87) PCT Pub. No.: WO2021/105048
PCT Pub. Date: Jun. 3, 2021

(65) Prior Publication Data
US 2023/0007753 A1 Jan. 5, 2023

(30) Foreign Application Priority Data
Nov. 28, 2019 (EP) ..................................... 19212133

(51) Int. Cl.
*H05B 47/155* (2020.01)
*H05B 47/115* (2020.01)

(52) U.S. Cl.
CPC ......... *H05B 47/115* (2020.01); *H05B 47/155* (2020.01)

(58) Field of Classification Search
CPC .. H05B 47/115; H05B 47/155; H05B 47/105; Y02B 20/40
(Continued)

(56) References Cited

U.S. PATENT DOCUMENTS 6,724,159 B2 * 4/2004 Gutta .................. H05B 47/165
315/292
7,161,556 B2 * 1/2007 Morgan ............... H05B 47/175
340/9.16
(Continued)

FOREIGN PATENT DOCUMENTS

WO 2010100586 A2 9/2010
WO 2013102881 A1 7/2013

*Primary Examiner* — Ryan Jager (57) ABSTRACT

A method for training a machine for automatizing lighting control actions, wherein the method comprises the steps of: controlling one or more lighting devices based on a first set of control parameters; controlling the one or more lighting devices based on a second set of control parameters; wherein the second set of control parameters is different from the first set of control parameters; detecting presence of a user based on a presence signal output from a presence sensing means; monitoring a response of the user related to the second set of control parameters; wherein the response is monitored during a time period; evaluating feedback of the user based on the monitored response; wherein the feedback is positive if no active response has been monitored; training the machine based on the evaluated feedback.

14 Claims, 4 Drawing Sheets

(58) Field of Classification Search
USPC .......................................................... 315/307
See application file for complete search history.

(56) References Cited

U.S. PATENT DOCUMENTS

| | | | |
|---|---|---|---|
| 7,911,158 B2* | 3/2011 | Verbrugh | H05B 47/10 |
| | | | 315/293 |
| 10,624,185 B2* | 4/2020 | Esfahani | G01S 19/14 |
| 2013/0249410 A1* | 9/2013 | Thompson | H05B 47/115 |
| | | | 315/158 |
| 2016/0195856 A1* | 7/2016 | Spero | H05B 47/125 |
| | | | 700/90 |

* cited by examiner

CONTROLLER FOR TRAINING A MACHINE FOR AUTOMATIZING LIGHTING CONTROL ACTIONS AND A METHOD THEREOF

CROSS-REFERENCE TO PRIOR APPLICATIONS

This application is the U.S. National Phase application under 35 U.S.C. § 371 of International Application No. PCT/EP2020/083028, filed on Nov. 23, 2020, which claims the benefit of European Patent Application No. 19212133.3, filed on Nov. 28, 2019. These applications are hereby incorporated by reference herein.

FIELD OF THE INVENTION

The invention relates to a method for training a machine for automatizing lighting control actions. The invention further relates to a controller and a lighting system for training a machine for automatizing lighting control actions.

BACKGROUND

Connected lighting refers to a system of one or more lighting devices which are controlled not by (or not only by) a traditional wired, electrical on-off or dimmer circuit, but rather by using a data communications protocol via a wired or more often wireless connection, e.g. a wired or a wireless network. These connected lighting networks form what is commonly known as the Internet of Things (IoT) or more specifically the Internet of Lighting (IoL). Typically, the lighting devices, or even individual lamps within a lighting device, may each be equipped with a wireless receiver or transceiver for receiving lighting control commands from a lighting control device according to a wireless networking protocol such as Zigbee, Wi-Fi or Bluetooth.

Generally, these (connected) lighting systems are preprogrammed with recommended sets of lighting parameters, which are usually based on manual rules and on sensor coupling. These parameters are selected for achieving a desired light effect on an 'average' person in an 'average' environment. Machine learning algorithms can be used to optimize light effects for a user based on the user feedback. For finding an optimal light effect, such optimization algorithms require explicit feedback from the user for each automatic action it takes. This approach however can be tedious for the user.

WO 2013/102881 discloses a method for determining user preference in light management of an area. The method comprises the sets of collecting data regarding artificial and natural light within the area, collecting data regarding weather conditions and collating the collected data with regard to temporal and geographical information associated with the space. The collected data is processed using stochastic processes to estimate the user's preferences at a specific time. Artificial lighting and natural lighting are adjusted based on the estimated user preferences. User inputs may be provided to indicate the user's satisfaction and/or dissatisfaction with the estimate. User preference setting are updated and maintained when the user is satisfied with the results.

SUMMARY OF THE INVENTION

It is an object of the present invention to provide optimal light effects for a user in an environment. It is a further object to provide an improved non-obtrusive feedback and learning mechanism based on user preference with a minimal user interaction (feedback), such that the user preference is obtained in a more natural way.

According to a first aspect, the object is achieved by a method for training a machine for automatizing lighting control actions, wherein the method comprises the steps of: controlling one or more lighting devices based on a first set of control parameters; controlling the one or more lighting devices based on a second set of control parameters; wherein the second set of control parameters is different from the first set of control parameters; detecting presence of a user based on a presence signal output from a presence sensing means; monitoring a response of the user related to the second set of control parameters; wherein the response is monitored during a time period; evaluating feedback of the user based on the monitored response; wherein the feedback is positive if no active response has been monitored; training the machine based on the evaluated feedback.

The method comprises controlling one or more lighting devices based on a first and a second set of control parameters, respectively. The first and the second set of control parameters are (perceivably) different. For instance, when a first and a second light effect are rendered based on the first and the second set of control parameters, respectively, the difference between the first light effect and the second light effect is perceivable by a user. For example, the second set of control parameters may be selected with a magnitude substantially different from the first set of control parameters resulting in a perceivable difference between the first and the second light effects. In another example, the duration of rendering the first and the second light effects is selected such that the difference becomes perceivable by a user. In an example, the controlling of the one or more lighting devices based on the first or the second set of control parameters may provide no light output from the one or more lighting devices, i.e. the one or more lighting devices are powered off. In this example, the perceivably difference may comprise from no light output to a light effect. The first and the second light effects may be rendered in an environment, such as an office, a factory, a house, etc.

The method further comprises detecting presence of a user based on a presence signal output from a presence sensing means. The presence detection may be based on one or more of: image recognition, RF-based presence sensing, infrared detection, radar, acoustic sensing, etc. The presence detection of a user may be based on a communication device signal, such as mobile phone, computer, etc. assumed to be co-located with the user. RF-based sensing and/or image recognition may be used if the user does not carry a communication device and does not transmit or receive any signal. The presence detection may be performed in the same environment where the one or more lighting devices have been controlled based on the first and the second set of control parameters. The presence detection may be performed in the same environment where the first and the second light effects have been rendered. The method further comprises monitoring a response of the user related to the second set of control parameters. The monitoring may be performed during a time period. The monitoring may comprise observing the user reaction to the second set of control parameters. For monitoring the response, the presence of user is an important step. The time period may be predetermined or may be chosen on the fly.

The method further comprises evaluating feedback of the user based on the monitored response. The feedback is considered as positive if no active response has been monitored while the user presence has been detected. In an example, if the user is pleased with the rendered light effect, (s)he will keep the rendered light effect and will not 'react' to it, e.g. by not changing it. The 'inaction' of the user related to the second set of control parameters represents a positive feedback. Since the machine is trained based on the evaluated feedback which comprises 'inaction' as a positive feedback, while the user presence has been detected, a more natural and improved non-obtrusive method is provided to train a machine for optimizing light effect.

In an embodiment, controlling of the one or more lighting devices based on the second set of control parameters may be triggered based on the user presence detection.

In an example, when the presence of the user is detected then subsequently the one or more lighting devices are controlled based on the second set of control parameters. In this example, the user is advantageously present when the second light effect is rendered. Therefore, (s)he may differentiate between the first and the second light effects and may provide his/her feedback on the second light effect. In an example, the one or more lighting devices are not providing illumination (powered off), and then based on the user presence; the one or more lighting devices are controlled to render a second light effect.

In an embodiment, the time period may start upon detecting the user presence and controlling the one or more lighting devices based on the second set of control parameters. In an embodiment the time period may be ceased when the presence is no longer detected.

The time period to monitor the response of the user may be based on the user presence detection and on controlling of the one or more lighting devices based on the second set of control parameters. In an example, the time period may start when presence of the user is detected in the environment and when the second light effect is rendered in the same environment. These both conditions, i.e. the user presence and controlling of the one or more lighting devices based on the second set of control parameters should be satisfied for starting of the time period. To assign a positive feedback to user inaction, the user must be present. Furthermore, the feedback should be based on the rendered second light effect. Therefore, the time period is advantageously started upon detecting the user presence and controlling the one or more lighting devices based on the second set of control parameters. In an example, the time period may be ceased when the presence is no longer detected. For instance, when the user leaves the environment, the 'inaction' does not anymore represent the user preference. The time period may be ceased when the controlling the one or more lighting devices to render the second light effect has been ceased.

In an embodiment, the method may further comprise detecting an activity of the user; and the time period may be based on the detected activity such that the time period may be ceased when the activity is no longer detected.

When the user is not active, e.g. (s)he is sleeping, said inactivity does not represent the user preference related to the rendered second light effect. Therefore, an activity of the user may be detected, and the time period may be based on the detected activity. The time period may be ceased with the activity is no longer detected. It is understood that the detected activity of the user, for instance, if (s)he is playing a video game, sleeping, etc., is different from inaction of the user related to the second set of control parameters.

In an embodiment, the method may further comprise determining an identity of the user; and determining the second set of control parameters based on the determined identity.

In a multiuser environment, i.e. when multiple users are present in the environment, it is important to identify the user and train the machine according to the preference of the identified user. In this example, the second set of control parameters may be based on the identified user.

In an embodiment, the method may further comprise determining the second set of control parameters based on a prior evaluated feedback.

The training of the machine may be an iterative process, e.g. the second set of control parameters may be based on a prior evaluated feedback. For example, if the user prefers a light effect and has indicated it via a prior evaluated feedback, the second light set of control parameters may be determined based on the prior light effect. For instance, if the user has indicated that (s)he prefers a high brightness level; the second set of control parameters may be determined such that the brightness level is in a high range. The training of the machine may iterate based on each evaluated feedback.

In an embodiment, the method may further comprise: receiving a signal indicative of a field of view of the user; determining one or more lighting devices with illumination in the field of view of the user; controlling the determined one or more lighting devices based on the second set of control parameters in the field of view of the user.

A field of view is an open observable area a user can see through his or her eyes or via an optical device. The one or more lighting devices may be located in the field of view of the user or at least have illumination in the field of view. Controlling of the determined one or more lighting devices based on the second set of control parameters is advantageously performed in the field of view of the user such that the user can observe the second light effect. If the rendered second light effect is not in the field of view of the user, the inaction of user may not represent the user preference related to the second set of control parameters.

In an embodiment, an active response may comprise controlling the one or more lighting devices based on a third set of control parameters based on a received user input; and wherein the feedback is negative if said active response is monitored.

An active response of the user related to the second set of control parameters may be to modify the second set of control parameters to produce a third set of control parameters or to select a third set of control parameters being independent of the second set of control parameters and control the one or more lighting devices thereon. The controlling of the one or more lighting devices based on a third set of control parameters may be based on a received user input, e.g. via a legacy wall switch, voice command etc. In an example, the third set of control parameters is the first set of control parameters. In alternate example, the third set of control parameters is different from the first set of control parameters. If the user does not like the second light effects, (s)he may control the one or more lighting devices to either render a different light effect or revert to the first light effect. Such monitored active response is considered as a negative feedback.

In an embodiment, an active response may comprise actuating at least one actuator, by the user, related to the rendered second light effect.

One of the other active responses related to the second set of control parameters may comprise actuating at least one actuator, e.g. a like or dislike button. For example, if the user actuates the like button, it is considered as a positive feedback, and if the user actuates the dislike button, it is considered as a negative feedback. The training of the machine is performed based on the evaluated feedback. The evaluation of the feedback (positive or negative) may be based on the context of the active response.

In an embodiment, the one or more lighting devices may be controlled based on the second set of control parameters prior to the user presence detection.

Alternative to detecting user presence and subsequently controlling the one or more lighting devices to render the second light effect, the one or more lighting devices may be controlled to render the second light effect prior to the user presence detection. To optimize the light effect, the user does not need to observe the change from the first light effect to the second light effect, only observing the second light effect and providing feedback may be sufficient for optimization.

In an embodiment, the machine may be trained using reinforcement learning, and wherein the positive feedback may be a positive reward and the negative feedback may be a negative reward.

Machine learning algorithms such as reinforcement learning may be used to train the machine to optimize the light effect. Reinforcement learning is a machine learning approach to optimize a policy, e.g. light control actions, by maximizing an ultimate reward through feedback. The feedback may be in the form of positive rewards and negative reward (or punishments), after a sequence of actions, e.g. rendering of the second light effect. The machine may be trained based on a positive reward if the feedback is positive and on a negative award (punishment) if the feedback is negative.

According to a second aspect, the object is achieved by a controller for training a machine for automatizing lighting control actions; wherein the controller may comprise a processor arranged for executing the steps of method according to the first aspect.

According to a third aspect, the object is achieved by a lighting system for training a machine for automatizing lighting control actions comprising a plurality of lighting devices arranged for illuminating an environment; a controller according to the second aspect.

According to a fourth aspect, the object is achieved by a computer program product comprising instructions which, when the program is executed by a computer, cause the computer to carry out the steps of the method according to the first aspect.

It should be understood that the computer program product and the system may have similar and/or identical embodiments and advantages as the above-mentioned method.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
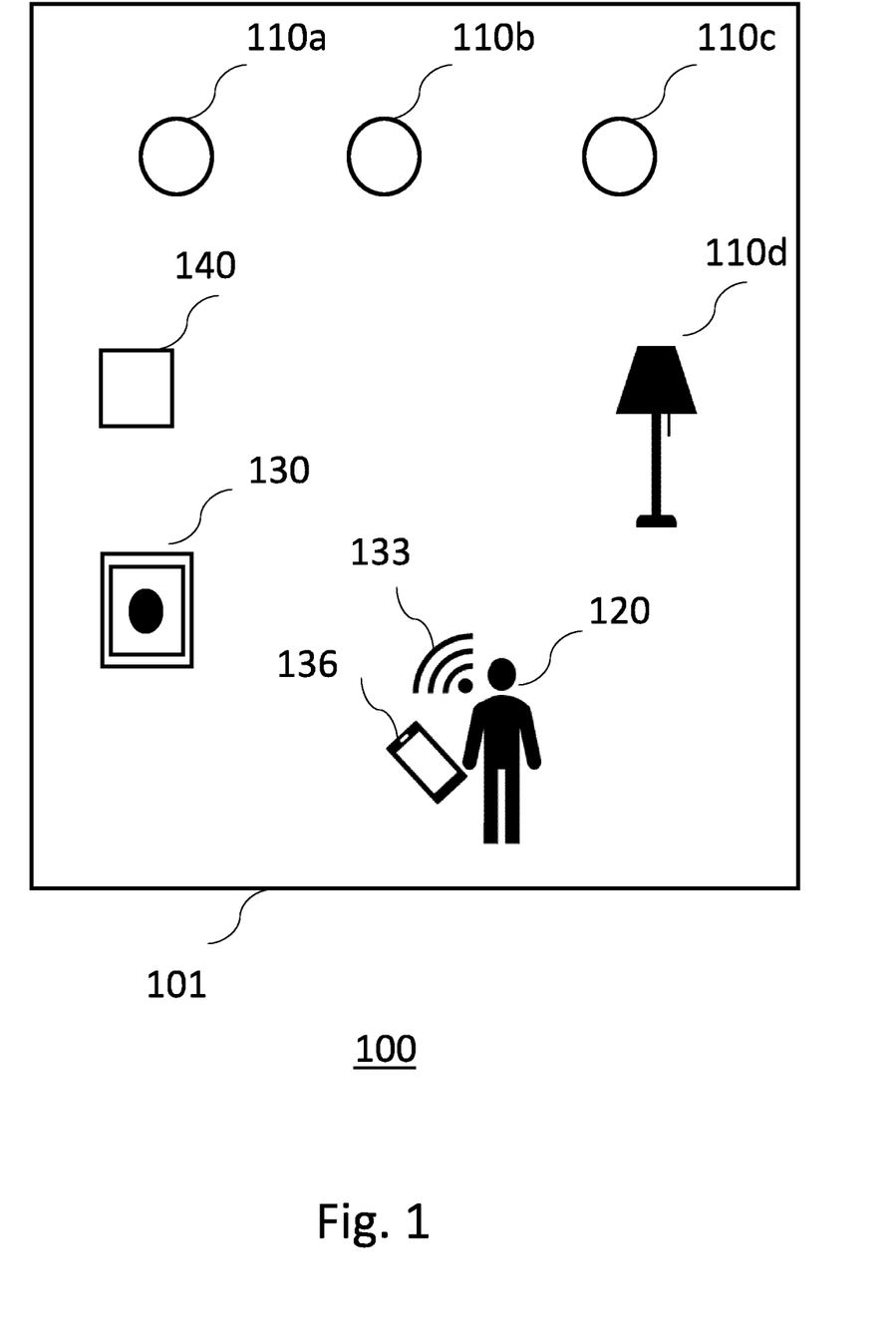
FIG. 1 shows schematically and exemplary an embodiment of a system for training a machine for automatizing lighting control actions.

FIG. 1 shows schematically and exemplary an embodiment of a system 100 with lighting device(s) 110a-d for illuminating an environment 101. The environment 101 may be an indoor or outdoor environment, such as office, a factory, a house, a grocery store or a hospital, a sports arena etc. The system 100 exemplary comprises four lighting devices 110a-d. The lighting devices 110a-d may be comprised in a lighting system. The lighting system may be a connected lighting system, e.g. Philips Hue, wherein the lighting devices 110a-d may be connected to an external network, e.g. Internet. A lighting device 110a-d is a device or structure arranged to emit light suitable for illuminating an environment 101, providing or substantially contributing to the illumination on a scale adequate for that purpose. A lighting device 110a-d comprises at least one light source or lamp (not shown), such as an LED-based lamp, gas-discharge lamp or filament bulb, etc., (optionally) with an associated support, casing or other such housing. Each of the lighting devices 110a-d may take any of a variety of forms, e.g. a ceiling mounted lighting device, a wall-mounted lighting device, a wall washer, or a free-standing lighting device (and the lighting devices need not necessarily all be of the same type). In this exemplary figure, the lighting devices 110a-c are ceiling mounted and the lighting device 110d is a free-standing lighting device. The system 100 may contain any number/type of the lighting devices 110a-d.

The lighting devices 110a-d may be controlled based on a first set of control parameters. The controlling of the lighting devices 110a-d may comprise controlling one or more of: color, color temperature, intensity, beam width, beam direction, illumination intensity, other parameters of one or more of the light sources (not shown) of the lighting devices 110a-d. The lighting devices 110a-d may be controlled based on a second set of control parameters. A first and a second light effect may be rendered when the lighting devices 110a-d are controlled based on the first and the second set of control parameters respectively. The second set of control parameters may be different from the first set of control parameters such that the difference between the first light effect and the second light effect is perceivable by a user 120. In a simple example, the light effect is a brightness level of the lighting devices 110a-d, for instance, the first light effect is a 30% brightness level, and the second light effect is a 70% brightness level. The second light effect, i.e. 70% brightness level, is determined such that the difference between the first light effect and the second light effect is perceivable by a user 120. For example, the selection of 70% brightness level is based on an ambient light level in the environment 101 such that a difference of 50% in brightness levels is perceivable by a user 120. In another example, the controlling of the lighting devices 110a-d based on the first set of control parameters provides no light output.

In an example, the light effect comprises light scenes which can be used to enhance, e.g. entertainment experiences such as audio-visual media, set an ambience and/or a mood of a user 120. For instance, for Philips Hue connected lighting system, the first light effect is an 'enchanted forest' light scene and the second light effect is Go-to-sleep light scene. The first and/or the second light effect may comprise a static light scene. The first and/or the second light effect may comprise a dynamic light scene, wherein the dynamic light scene comprises light effects which change with time. For the dynamic light scene, the first and/or the second light effect may comprise a first light state and a second light state. The first light state may comprise a first (predefined) pattern and the second light state may comprise a second (predefined) pattern. The pattern may comprise a duration, level of dynamism of the light effects etc. The first and the second set light states may be related to a first and a second subset of the second set of control parameters respectively. In such an example, the training of the machine comprises automatizing the (first and/or second) subsets of the second set of control parameters.

The system 100 may further comprise a presence sensing means, which is exemplary a presence sensor 140 in the figure. The system 100 may comprise any number of presence sensors. The presence sensing means may comprise a single device 140 or may comprise a presence sensing system comprising one or more devices arranged for detecting user presence. The system 100 may comprise sensors (not shown) of other modalities such as light sensor for detecting ambient light levels, a temperature sensor, a humidity sensor, a gas sensor such as a $CO_2$ sensor, a particle measurement sensor, and/or an audio sensor. The presence sensor 140 may be arranged for sensing a signal indicative of a presence of a user 120. The presence sensor 140 may be a passive infrared sensor, an active ultrasound sensor or an imaging sensor such as a camera. Any sensing method or presence sensor, known in the art to detect user presence, may be used for detected presence of a user 120. The user presence may be detected based on presence signal output from a plurality of different presence sensors. The user 120 presence may be detected in the environment 101. The presence detection may be performed continuously, periodically or at random times. In an example, the second light effect may be rendered subsequently upon detecting the presence of the user 120. Alternatively, the second light effect may be rendered prior to the user presence detection.

A signal indicative of the field of view of the user 120 may be received or the field of view may be determined based on an orientation signal output from an orientation sensor (not shown) which is able to detect the orientation of the user 120. The field of view of the user 120 may be determined based on a user position. In an example, the user position may comprise an absolute location of the user 120 in the environment 101. In another example, the user position may comprise a relative position of the user 120 with respect to one or more lighting devices and/or with respect to the first and the second rendered light effects. The position of the user 120 may be determined using the presence sensing means or by other means known in the art to detect position. The lighting devices 110a-d which have illumination in the field of view of the user 120 may be determined. The determined lighting devices 110a-d may be controlled to render the second light effect based on the second set of control parameters in the field of view of the user 120. In an example, a signal indicative of a trajectory of a (moving) user 120 may be received or alternatively a trajectory of a (moving) user 120 may be determined, e.g. by using an imaging device such as a camera. The lighting devices 110a-d having illumination in the trajectory of the user 120 may be determined. The determined lighting devices 110a-d may be controlled to render the second light effect based on the second set of control parameters in the trajectory of the (moving) user 120.

A response of the user 120 may be monitored related to the second set of control parameters, wherein the response is monitored during a time period. The time period may start upon detecting the user presence and controlling the one or more lighting devices to render the second light effect. The time period may be ceased when the presence is no longer detected. The sequence of these both conditions, i.e. user presence detection and rendering of the second light effect, may be different, such that the user presence is detected first and the second light effect is rendered later or other way around. Alternatively, both conditions may occur at the same time. The time period may be predetermined and may be selected such that the time period is above a threshold value. In an example, if the time period is less than a threshold value, for instance, it starts upon detecting presence and ceased when the presence is no longer detected, but the time period is less than a threshold value, the monitored response is discarded. An example of such situation may be when the user 120 is not present in the environment 101 for a long time, e.g. (s)he has come to pick up something and has left the environment 101. In these situations, though the lighting devices 110a-d may have been controlled to render the second light effect, but the user 120 might not have observed the second light effect. Therefore, the monitored response for such a small time period is discarded. In another example, the time period may be based on an activity of the user 120. For example, an imaging sensor (e.g. camera) may be used to detect an activity of the user 120. The time period is ceased when the activity is no longer detected, e.g. if the user 120 is sleeping. The time period may be based on the rendered light effect, e.g. if the one or more lighting devices 110a-d are turned off, i.e. controlled to not provide illumination to the environment 101, the monitored response in such situations may be discarded. The monitored response, for the dynamic light scene, may be related to the first light state and/or to the second light state.

A feedback of the user 120 may be evaluated based on the monitored response of the user 120. A positive feedback may be assigned if no active response has been monitored. A positive feedback represents that the user 120, whose presence has been detected in the environment, is pleased with the second light effect and that is why (s)he does not want to provide any active response related to the second set of control parameters. For evaluating the feedback, e.g. for evaluating 'inaction' as positive feedback, the user presence is a key element. An active response may comprise controlling the lighting devices 110a-d to render a third light effect based on a third set of control parameters based on a received user input; and wherein the feedback may be negative if said active response is monitored. The third set of control parameters may be the first set of control parameters, which indicates that the user 120 reverts the second light effect back to the first light effect because (s)he does not like the second light effect. Therefore, a negative feedback may be assigned to such active feedback. For the dynamic light scene, the active response may comprise changing the second light state, which may indicate that the user is not pleased with the second light state. The system may further comprise a wall-switch 130 which may be arranged for controlling the lighting devices 110a-d. For example, the user 120 uses the wall-switch 130 to control the lighting devices 110a-d. Alternatively, the user 120 may use a voice command 133 or his/her mobile device 136 to control the lighting devices 110a-d. In an example, the active response may comprise actuating at least one actuator (not shown), by the user 120, related to the rendered second light effect. The at least one actuator may be a like/dislike button or undo button, e.g. on the user's mobile device 136 to indicate his/her preference. The at least one actuator may be used to control the lighting devices 110a-d.

A machine may be trained based on the evaluated feedback. Machine learning algorithms, such as supervised learning, e.g. SVM, decision forest etc. may be used to train the machine. Reinforcement learning, as further discussed in FIG. 4, may be used to train the machine. For reinforcement learning, the positive feedback may be a positive reward and the negative feedback may be a negative reward (or punishment). The learning algorithm may comprise iterative learning such that the determination of the second set of control parameters may be based on a prior evaluated feedback, wherein the algorithm iterative trains the machine. The training may comprise different phases, such as a feedback phase wherein in the feedback phase the feedback is evaluated based on the monitored response of the user 120. The length of the feedback phase may comprise the time period, which is assumed to be long enough to capture sufficient information needed for training. Subsequent to the feedback phase, a training phase may be started. The training phase may be defined during which the machine is trained. For iterative learning, the feedback phase and the training phase may be iteratively used. In an example, the feedback phase may be the first week when the lighting devices 110a-b have been, e.g. initially installed, commissioned and the user 120 has started using them. The duration of the feedback phase may be defined by the user 120. In an example, in the training phase may comprise a learning phase and a fine-tuning phase; wherein in the learning phase, the second set of control parameters may be learnt based on a user feedback. In the fine-tuning phase, the second set of control parameters may be further optimized based on further user inputs. In an example, an identity of the user 120 is determined, for instance, by the imaging sensor. The determination of the second set of control parameters may be based on the determined identity, e.g. based on the preference of the identified user.

Figure 2:
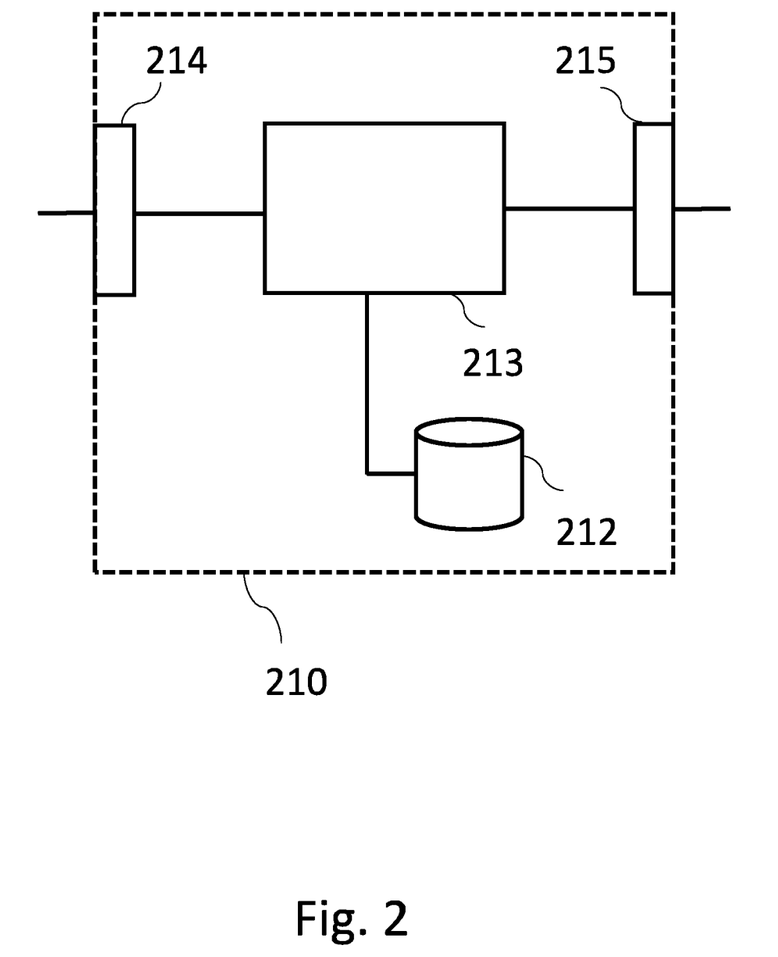
FIG. 2 shows schematically and exemplary an embodiment of a controller for training a machine for automatizing lighting control actions.

FIG. 2 shows schematically and exemplary an embodiment of a controller 210 for training a machine for automatizing lighting control actions. The controller 210 may comprise an input unit 214 and an output unit 215. The input 214 and the output 215 units may be comprised in a transceiver (not shown) arranged for receiving (input unit 214) and transmitting (output unit 215) communication signals. The communication signal may comprise control instructions to control the lighting devices 110a-d. The input unit 214 may be arranged for receiving communication signals from the switch 130 and/or from the voice command 133. The input unit 214 may be arranged for receiving the communication signals from the user mobile device 136. The communication signals may comprise control signals. The controller 210 may further comprise a memory 212 which may be arranged for storing communication IDs of the lighting devices 110a-d and/or the sensor 140 etc. The controller 210 may comprise a processor 213 arranged for training the machine.

The controller 210 may be implemented in a unit separate from the lighting devices 110a-d/sensor 140, such as wall panel, desktop computer terminal, or even a portable terminal such as a laptop, tablet or smartphone. Alternatively, the controller 210 may be incorporated into the same unit as the sensor 140 and/or the same unit as one of the lighting devices 110a-d. Further, the controller 210 may be implemented in the environment 101 or remote from the environment (e.g. on a server); and the controller 210 may be implemented in a single unit or in the form of distributed functionality distributed amongst multiple separate units (e.g. a distributed server comprising multiple server units at one or more geographical sites, or a distributed control function distributed amongst the lighting devices 110a-d or amongst the lighting devices 110a-d and the sensor 140). Furthermore, the controller 210 may be implemented in the form of software stored on a memory (comprising one or more memory devices) and arranged for execution on a processor (comprising one or more processing units), or the controller 210 may be implemented in the form of dedicated hardware circuitry, or configurable or reconfigurable circuitry such as a PGA or FPGA, or any combination of these.

Regarding the various communication involved in implementing the functionality discussed above, to enable the controller 210, for example, to receive presence signal output from the presence sensor 140 and to control the light output of the lighting devices 110a-d, these may be implemented in by any suitable wired and/or wireless means, e.g. by means of a wired network such as an Ethernet network, a DMX network or the Internet; or a wireless network such as a local (short range) RF network, e.g. a Wi-Fi, ZigBee or Bluetooth network; or any combination of these and/or other means.

Figure 3:
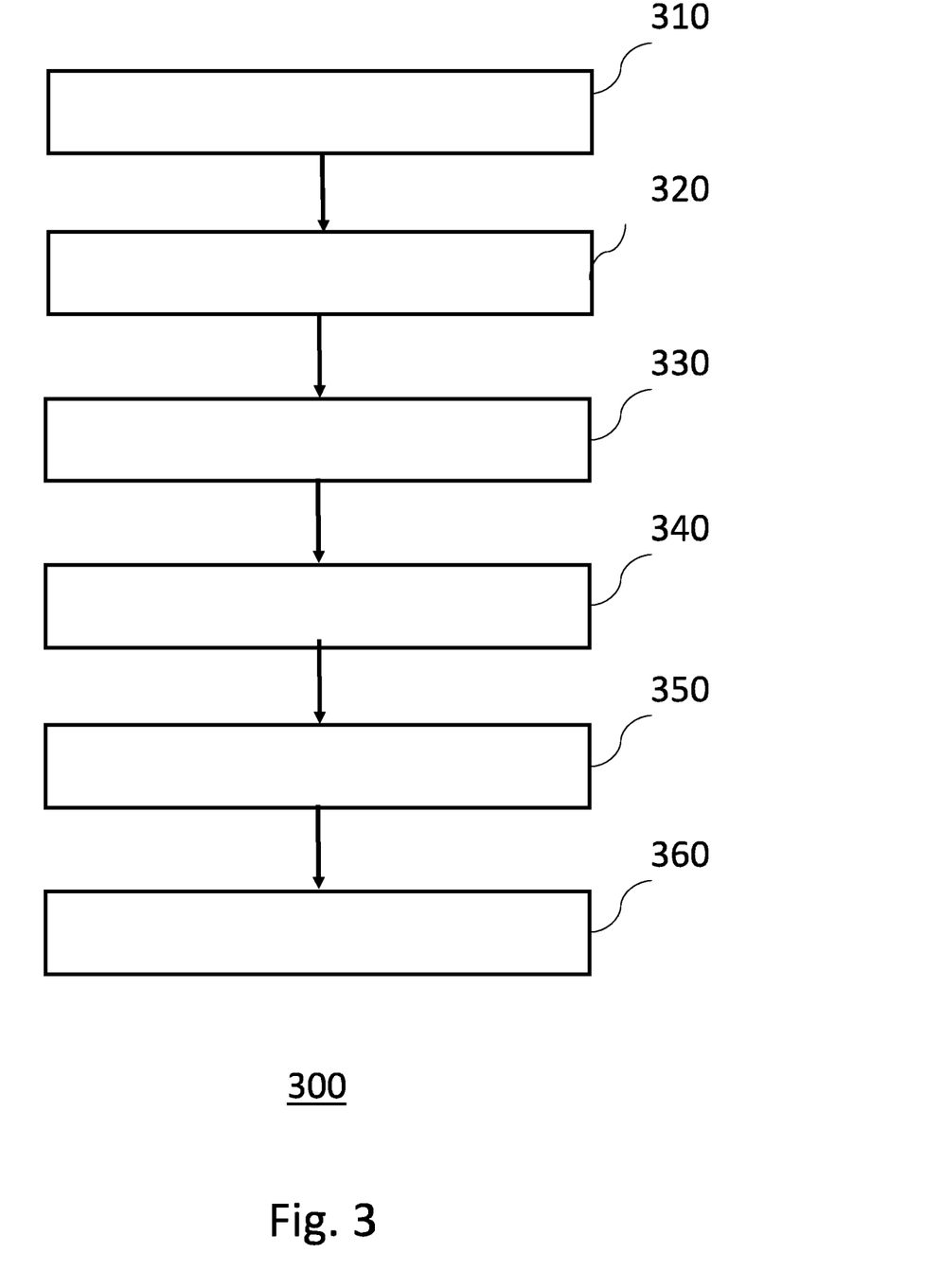
FIG. 3 shows schematically and exemplary a flowchart illustrating an embodiment of a method for training a machine for automatizing lighting control actions.

FIG. 3 shows schematically and exemplary a flowchart illustrating an embodiment of a method 300 for training a machine for automatizing lighting control actions. The method 300 may comprise controlling 310 one or more lighting devices 110a-d based on a first set of control parameters, e.g. to render a first light effect. The one or more lighting devices 110a-d may be further controlled 320 based on a second set of control parameters, e.g. to render a second light effect. The light effect(s) may comprise a level of luminance, chrominance, saturation, color-balance, and/or a light scene etc. The control 310-320 of the lighting devices 110a-d may be in a field of view of a user 120. The control 310-320 of the lighting devices 110a-d may be in a trajectory of the user 120. The control of the lighting devices 110a-d may be relative to a position of the user 120. The position of the user 120 may be determined using the presence sensing means. The second set of control parameters may be different from the first set of control parameters, for instance, in a way that the difference between the first light effect and the second light effect is perceivable by a user 120. A user 120 presence may be detected 330 based on a presence signal output from a presence sensing means. The presence sensing means may comprise image sensing such as a camera, RF-based presence sensing etc. The method 300 may further comprise monitoring 340 a response of the user 120 related to the second set of control parameters; wherein the response may be monitored during a time period. In an example, the time period may be based on the controlling 320 of the lighting devices 110a-d to render the second light effect and on detection 330 of user presence. In another example, an activity of the user 120 may be determined and the time period may be based on the determined activity of the user 120.

The method 300 may further comprise evaluating 350 feedback of the user 120 based on the monitored response. The feedback may be positive if no active response has been monitored. An active response may comprise controlling the one or more lighting devices 110a-d to render a third light effect based on a third set of control parameters based on a received user input; and wherein the feedback may be negative if said active response is monitored.

The method may further comprise training 360 the machine based on the evaluated feedback. Machine learning algorithms may be used to train the machine. For example, supervised learning may be used. Supervised learning is the machine learning task of learning a function or model that maps an input to an output based on an input-output data pairs. It infers a function from a labeled training data set comprising of a set of training data. In supervised learning, each sample in the training data set is a pair consisting of an input (e.g. a vector) and a desired output value. For instance, the evaluated feedback is output, and the second set of control parameters is the input vector. The training data set comprises the output (feedback) and the input (the second set of control parameters). A supervised learning algorithm, such as Support vector machine (SVM), decision tree (random forest) etc., analyzes the training data set and produces an inferred function or model, which can be used for making predictions based on a new data set. In this example, a binary classifier machine may be trained, which may predict the user 120 preference for a new set of control parameters. If the model predicts a positive user preference for the new set of control parameters, the lighting devices 110a-d may be controlled to render a new light effect based on the new set of control parameters. Alternative to supervised learning, reinforcement learning may be used to train the machine as further discussed in FIG. 4. Other learning algorithms such as rule-based learning, probabilistic reasoning, fuzzy logic to train a machine for automatizing lighting control action known in the art may also be considered.

The method 300 may be executed by computer program code of a computer program product when the computer program product is run on a processing unit of a computing device, such as the processor 213 of the controller 210.

Figure 4:
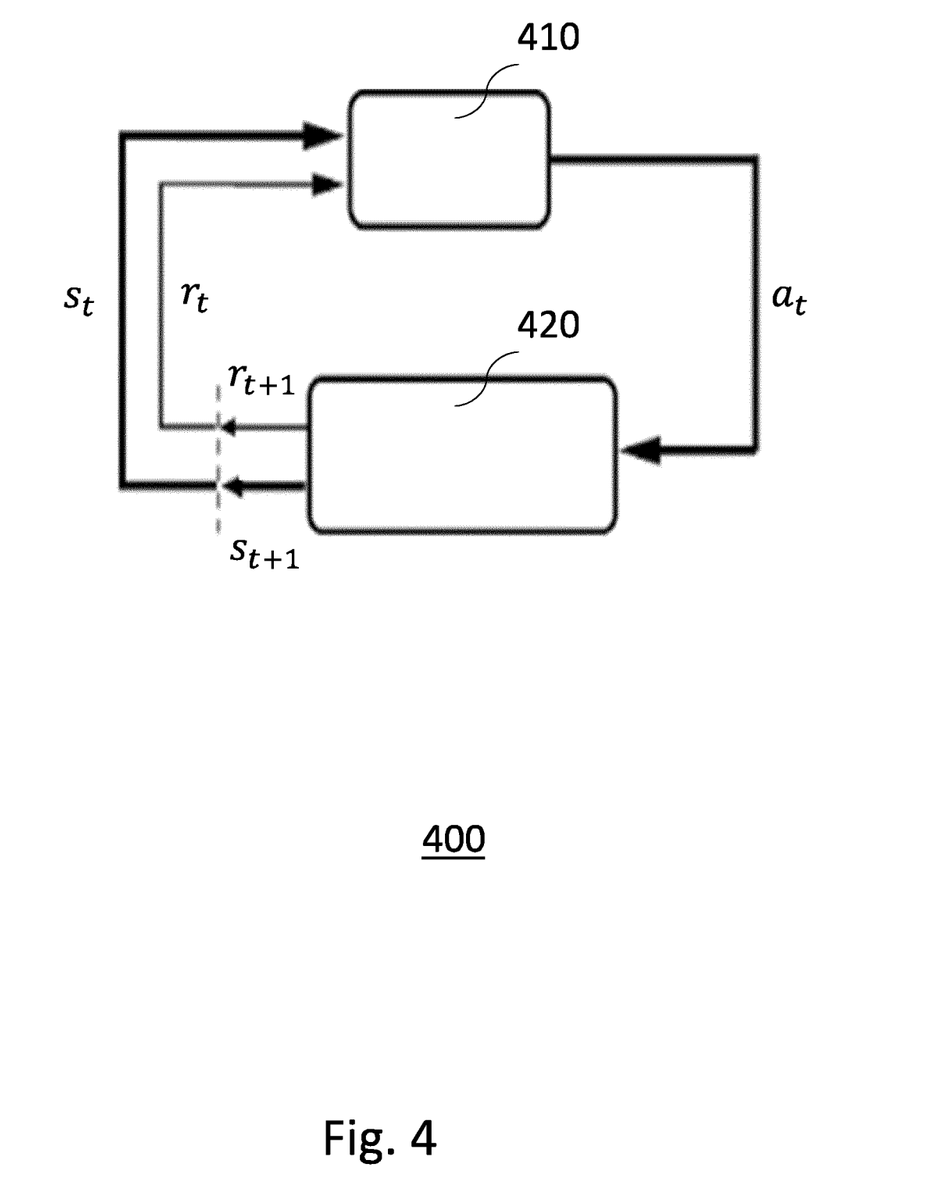
FIG. 4 shows schematically and exemplary a machine learning approach for training a machine for automatizing lighting control actions.

FIG. 4 shows schematically and exemplary a machine learning approach, i.e. Reinforcement learning, for training a machine for automatizing lighting control actions. Reinforcement learning is a machine learning approach to optimize a policy, e.g. lighting control actions, by maximizing an ultimate reward $r_t$ through feedback. The ultimate reward $r_t$ is in the form of rewards and punishments for a sequence of actions $\alpha_t$, e.g. rendering of a light effect. In reinforcement learning, the machine perceives its environment's state $s_t$ as a vector of features. The machine can execute actions in every state $s_t$ and based on action $\alpha_t$ receives either a reward or a punishment $r_{t+1}$ and moves to another state $s_{t+1}$. The goal of the reinforcement learning is to learn a policy, that is the prescription of the optimal action at to execute in each state $s_t$. The action is optimal if it maximizes the average reward.

In an example, the agent 410 is the lighting system comprising one or more lighting devices 110a-d. The agent 410 may be arranged for taking actions $\alpha_t$, e.g. controlling the one or more lighting devices 110a-d to render the first and/or the second light effects. The environment 420 may be an office, a garden, a factory, a house, a grocery store or a hospital. The action $\alpha_t$ of the agent 410 affects the environment 420, i.e. the controlling of the one or more lighting devices 110a-d changes the illumination in the environment.

A presence of a user 120 may be detected and a response of the user 120 related to the second set of control parameters may be monitored. The response may be monitored during a time period. A feedback may evaluated wherein a positive feedback may be assigned if no active response has been monitored. An active response may comprise controlling the one or more lighting devices 110a-d to render a third light effect based on a third set of control parameters based on a received user input; and wherein the feedback is negative if said active response is monitored. The positive feedback may indicate that the user is pleased with the second light effect, whereas the negative feedback may indicate that the user is not pleased and (s)he prefers to change the second light effect to a third light effect. The ultimate reward $r_t$ may comprise reward and punishment corresponding to, in this example, the positive feedback and the negative feedback respectively.

The state $s_t$ is a light effect, e.g. the first light effect, the second light effect etc. With every action $\alpha_t$ of the agent 410, the user 120 may be monitored and the feedback is evaluated as reward and punishment. Based on the reward and punishment, reinforcement learning optimizes the light effect, i.e. action of the agent 410 for the user 120 in the environment 420. Different reinforcement learning algorithms such as Q-Learning, State-Action-Reward-State-Action (SARSA), Deep Q Network (DQN), Deep Deterministic Policy Gradient (DDPG) etc. may be used for training the machine for automatizing lighting control actions.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

What is claimed is:

1. A method for training a machine for automatizing lighting control actions, wherein the method comprises the steps of:

controlling one or more lighting devices based on a first set of control parameters;

controlling the one or more lighting devices based on a second set of control parameters; wherein the second set of control parameters is different from the first set of control parameters;

detecting presence of a user based on a presence signal output from a presence sensing means;

monitoring a response of the user related to the second set of control parameters; wherein monitoring comprises observing a user reaction to the second set of control parameters; wherein the response is monitored during a time period while the user presence has been detected; wherein the time period is ceased when the presence is no longer detected;

evaluating feedback of the user based on the monitored response; wherein the feedback is positive if no active response has been monitored; wherein an active response comprises controlling the one or more lighting devices based on a third set of control parameters based on a received user input; and wherein the feedback is negative if said active response is monitored; and training the machine based on the evaluated feedback.

2. The method according to claim 1, wherein controlling the one or more lighting devices based on the second set of control parameters is triggered based on the user presence detection.

3. The method according to claim 1, wherein the time period starts upon detecting the user presence and controlling the one or more lighting devices based on the second set of control parameters.

4. The method according to claim 1, wherein the method further comprises detecting an activity of the user; and wherein the time period is based on the detected activity such that the time period is ceased when the activity is no longer detected.

5. The method according to claim 1, wherein the method further comprises:
determining an identity of the user; and
determining the second set of control parameters based on the determined identity.

6. The method according to claim 1, wherein the method further comprises:
determining the second set of control parameters based on a prior evaluated feedback.

7. The method according to claim 1, wherein the method further comprises:
receiving a signal indicative of a field of view of the user;
determining one or more lighting devices with illumination in the field of view of the user;
controlling the determined one or more lighting devices based on the second set of control parameters in the field of view of the user.

8. The method according to claim 1, wherein the third set of control parameters comprises the first set of control parameters.

9. The method according to claim 1, wherein an active response comprises actuating at least one actuator, by the user, related to the second set of control parameters.

10. The method according to claim 1, wherein the one or more lighting devices are controlled based on the second set of control parameters prior to the user presence detection.

11. The method according to claim 1, wherein the machine is trained using reinforcement learning, and wherein the positive feedback is a positive reward and the negative feedback is a negative reward.

12. A controller for training a machine for automatizing lighting control actions; wherein the controller comprises a processor arranged for executing the steps of method according to claim 1.

13. A lighting system for training a machine for automatizing lighting control actions comprising
a plurality of lighting devices arranged for illuminating an environment;
a controller according to claim 12.

14. A non-transitory computer program product comprising instructions which, when the program is executed by a computer, cause the computer to carry out the steps of the method of claim 1.

* * * * *